Jan. 19, 1954    J. F. McMULLEN    2,666,741
REGENERATION OF MIXED SINGLE BED DEIONIZATION
Filed Nov. 9, 1950    3 Sheets-Sheet 1
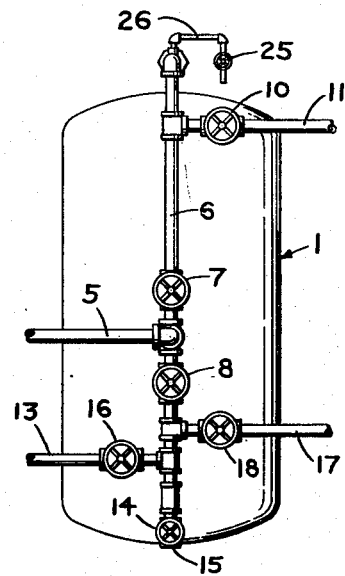
FIG. 1
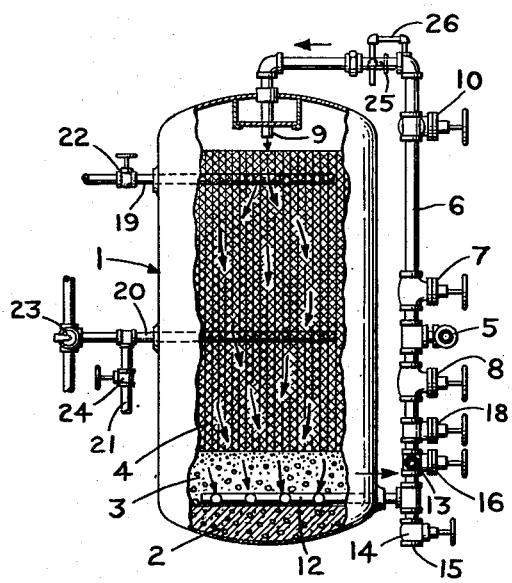
FIG. 2
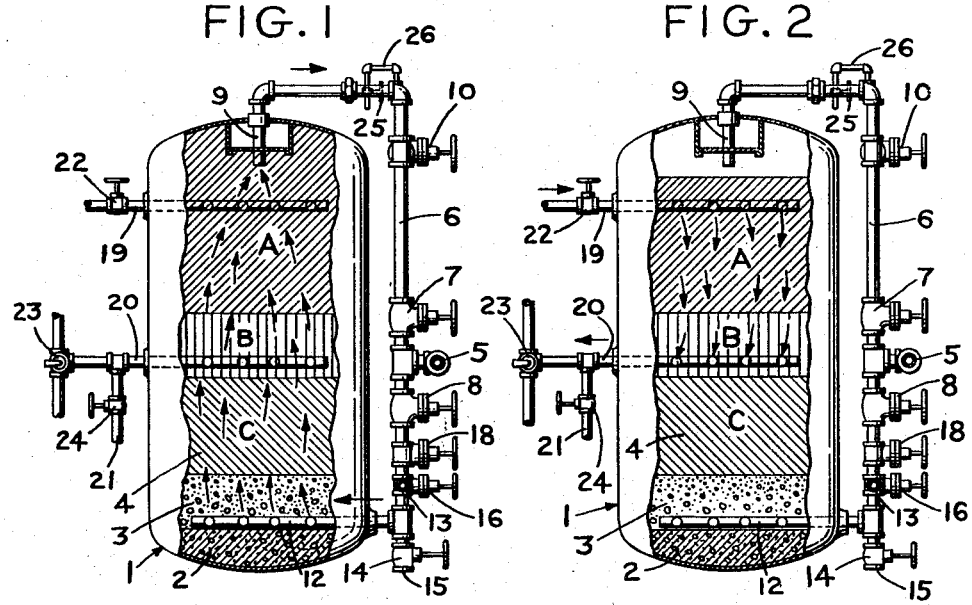
BACKWASH AND HYDRAULIC GRADING
FIG. 3
ANION REGENERATION
FIG. 4
JAMES F. McMULLEN
INVENTOR.
BY

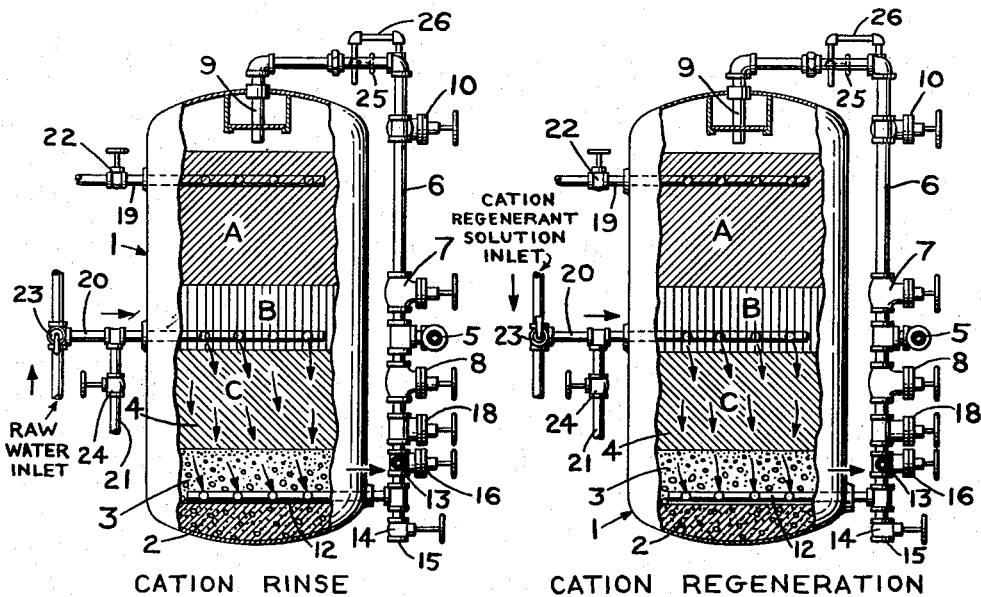
FIG. 5 — CATION RINSE
FIG. 6 — CATION REGENERATION
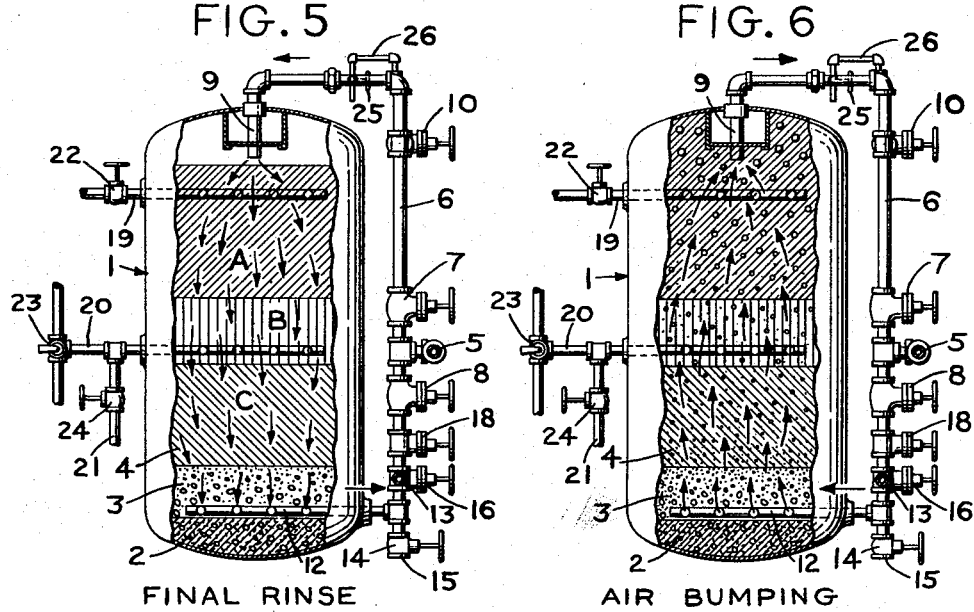
FIG. 7 — FINAL RINSE
FIG. 8 — AIR BUMPING
JAMES F. McMULLEN
INVENTOR.

Jan. 19, 1954 J. F. McMULLEN 2,666,741
REGENERATION OF MIXED SINGLE BED DEIONIZATION
Filed Nov. 9, 1950 3 Sheets-Sheet 3

JAMES F. McMULLEN
*INVENTOR.*

Patented Jan. 19, 1954

2,666,741

UNITED STATES PATENT OFFICE 2,666,741

REGENERATION OF MIXED SINGLE BED DEIONIZATION

James F. McMullen, Pelham, N. Y., assignor to Worthington Corporation, a corporation of Delaware Application November 9, 1950, Serial No. 194,857

10 Claims. (Cl. 210—24)

This invention relates generally to water treating apparatus of the ion exchange type and more particularly to a mixed single bed deionization type of water treating apparatus which relies on the difference in specific gravities between the specific anion and cation exchange resins in the mixed bed and that of an inert substance or material to facilitate the separation and regeneration of the said anion and cation exchanges.

In the mixed bed type of water treating apparatus, more recent construction is to provide a suitable tank or cylinder in which a single bed formed of a combination of anion and cation exchange resins is placed. Water to be treated is then passed downwardly or upwardly through the bed, removal of the specific water hardening salts and mineral salts occurring by direct exchange of the anions and cations forming these salts with the anion and cation portions of the exchange resins, the equilibrium phenomena and quantitative exchange of ions which occurs being known and understood by those skilled in the art of water treating.

The direct exchange of respective ions between the solution and the exchange resins continues until the exchange resins are saturated with absorbed ions being removed and the exchange capacity is then considered to be exhausted. This exchange capacity however, can be restored by treating the respective exchange resins with a suitable regenerant solution. The entire cycle so far as the resins are concerned therefor involving saturation and regeneration.

Regeneration, may be accomplished relying on the fact that the anion exchange resins are generally lighter than the cation exchange resins, the physical property being adapted to allow substantially easy hydraulic grading of the respective exchange resins, for when water is passed upwardly through the tank the lighter anion exchange resins disperse and collect on the upper portion of the bed, the cation exchange resins filling the lower portion. After hydraulic grading the alkaline regenerant solution, generally sodium hydroxide, which is used to regenerate the anion exchange resin is first passed downwardly through the entire bed. When passed through the cation exchange resin the alkaline regenerant solution will partially convert the cation exchange resin to the "sodium" form, thereby minimizing the precipitation of "sulfates" in the subsequent regeneration of the cation exchange resins with the acid regenerant solution, generally dilute sulphuric acid.

In the regeneration of the cation bed, however, the acid must be kept from the anion exchange resin as much as possible. It has been found in the mixed single bed type of deionization water treating equipment that this may be accomplished to a great degree by placing or positioning the acid regenerant solution inlet at or below the dividing line formed when the exchange resins are hydraulically graded prior to passing the regenerant solutions therethrough.

In the regular operation of the water treating apparatus, it has been further found that the normal attrition which occurs in the use of the resins will in effect, however, lower the dividing line, and the acid regenerant solution will be injected into the anion exchange resin portion of the bed near the bottom thereof which prevents or nullifies regeneration of that portion of the anion exchange resin.

The present invention relying specifically on the difference in specific densities between the anion and cation exchange resins contemplates a novel method of increasing the size of or rather the thickness of the dividing line between the anion and cation exchange resins by inserting a third material of intermediate density which would be intimately mixed with the exchangers during operation, but when the hydraulic separation takes place prior to the regeneration steps, would settle between the anion and cation exchange resins. It is understood that this third material would have to be of the proper screen size to insure complete separation and thorough grading, and in addition would have to be an inert material which while it could perform same additional function such as filtering the water during treatment would not be subject to attack by either alkaline or acid regenerant solutions. Under this novel arrangement a separation or boundary division of as great as 20 to 25% of the total bed depth is contemplated so that inlet and exit outlets for acids, wash water, waste regenerant solution, etc., might be disposed at this level towards the bottom thereof to reduce any possibility of acid working its way upward into the anion exchange resin bed during the initial regeneration steps and to provide flexibility of the various steps thereof. In addition, should attrition losses cause the bed size to reduce, the intermediate material would work its way downward in relation to the acid distribution inlet line and afford the same protection for a long time.

Accordingly, it is an object of the present invention to increase the efficiency of the regeneration process in a mixed single bed water treating apparatus by utilizing along with the anion and cation exchange resins making up the mixed bed, a third material with a specific density intermediate that of the respective anion and cation exchange resins.

It is another object of the present invention to provide a structure to expedite the performance of the regeneration cycle, and to provide a more economic handling of the regenerant solutions.

With these and other objects in view, as may appear from the accompanying specification, the invention consists of various features of construction and combination of parts, which will be first described in connection with the accompanying drawings, showing a regeneration of mixed single bed deionization apparatus of a preferred form embodying the invention, and the features forming the invention will be specifically pointed out in the claims.

In the drawings:

Figure 1 is a side elevation of one type of water softener utilizing the present invention.

Figure 2 is a vertical section through the water softener showing the anion and cation exchange resins and the inert material in the mixed relationship to form the bed.

Figures 3 to 8 are diagrammatic vertical sections illustrating various phases of the regeneration cycle of the unit.

Figure 9:
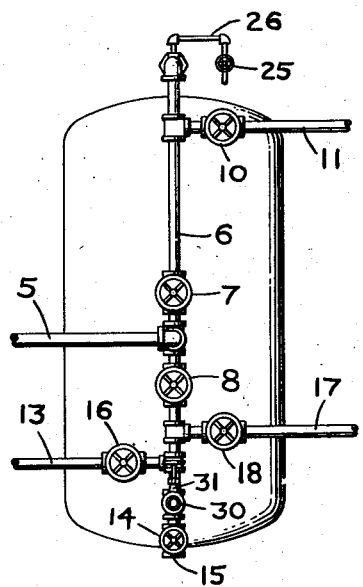
Figure 9 is a side elevation of a modified form of water softener utilizing the present invention.

Referring more specifically to the drawings the water treating equipment shown in Figures 1 and 2 of the drawings embodies a tank or receptacle 1 having a foundation bed 2. Non-siliceous gravel-like material 3 rests upon the foundation bed and separates therefrom mixed bed 4 composed of ion exchange resins and other materials as is hereinafter described.

Mixed bed 4 will comprise an anion exchange resin, a cation exchange resin and some third material having a specific density and backwash flotation characteristic intermediate that of the anion and cation resins. It being understood that the specific quantities of anion and cation resins will depend on the amount of ions present in the raw water or other solution being forced through the mixed bed. Only a sufficient quantity of the third substance will also be needed which will give a good separation of the anion and cation exchange resins approximately 20% being indicated in the drawings herein.

The ion-exchange resins either of the anion or cation type are easily purchasable on the open market, and it is generally found at the present time that the anion exchange resins are of a lesser specific density than the cation exchange resins. The particle size of these resins can be varied so that usually when purchased in a mixture or separately, substantially the same particle size for each of the respective anion and cation exchange resins can be secured, whereby their respective backwash flotation rates, which relate in part to the specific densities and the particle size of the resins, will approximate each other, causing the resin with the lighter specific density to disperse itself at the top of the bed during the hydraulic grading of the mixed bed 3 prior to regeneration.

The third material or substance may be any type of polystyrene resin, non-impregnated resin or other material, all easily purchasable on the open market, which will have a specific density and particle size which will give it a backwash flotation rate intermediate that of the respective anion and cation exchange resins utilized in the water treating apparatus.

It is here noted that while the present preferred form of the invention is illustrated in connection with water treating apparatus that there are other resins utilized in deionization type equipment and processes which go through the general cycle of saturation and regeneration above described which are easily adapted to utilize the persent invention and that it is not intended to limit the invention to water treating apparatus.

In addition, the present figures show a down-flowing or down-pass type of water treating apparatus which is the preferred form because it will supply a greater quantity of fluid and give increased contact between the particles forming the mixed bed 4 and the water passing therethrough. It is understood, however, that the present invention can be applied to up-flow or up-pass types of apparatus if the velocity of the water passing through the bed is controlled.

Normal operation

In normal operation the water to be deionized enters through the raw water inlet pipe 5 which meets the main conduit 6 between raw water control valves 7 and 8, passing upwardly through the main conduit 6 into the tank or receptacle 1 through the outlet 9 when valve 7 is open and valve 8 is closed. The backwash control valve 10 in backwash line 11 connected to the main conduit 6 above the raw water control valve 7 will be closed at all times except when the bed 4 is rinsed or hydraulically graded prior to or during regeneration as hereinafter described.

The water flows downwardly through the mixed bed 4 where the desired ion-exchange occurs passing to the outlet means 12 at or near the bottom thereof. Outlet means 12 meets the main conduit 6 between the air line inlet pipe 13 and the waste valve 14 for the waste outlet 15 of the main conduit 6. Both the waste valve 14 and the inlet control valve 16 provided for the air line inlet pipe 13 will be closed during normal operation and accordingly the water will pass upwardly to the service or lead off pipe 17 through and under control by service valve 18 to be conducted to some suitable storage space (not shown) or the point where it is to be used.

Normal operation will continue until the exchange capacity of the ion exchange resins is exhausted at which time the resins are regenerated as hereinafter described.

Regeneration

With the present invention there will be several systems of regenerating the resins forming the mixed bed. The preferred method or system of regeneration is shown diagrammatically in figures 3 to 8 of the drawings, while modified forms thereof are shown diagrammatically in Figures 9 and 10.

Referring first to Figure 3, the first step shown is the hydraulic grading of the mixed bed 4 which is accomplished by backwashing the mixed bed with raw water.

Thus, raw water control valve 7 and service line control valve 18 are closed; backwash line control valve 10 is opened and then raw water control valve 8 is opened to allow water to pass from the raw water inlet line 5 through the main conduit 6 to the outlet means 12 whence it enters into the tank 1 and flows upwardly expanding and floating the mixed bed 4, and then passing through outlet 9 on main conduit 6 and to the backwash line 11 where it is passed to waste.

It is the expanding and floating of the bed plus the tumbling of the particles forming the bed during the backwash process that causes the particles to stratify into anion exchange resin layer A, third material layer B, and cation exchange resin layer C, as is clearly indicated in Figure 4 of the drawings. The length of time for optimum hydraulic grading being necessarily empirical with each apparatus and each mixed bed depending on the various factors such as quantity, size of particles etc. When, however, the hydraulic grading is determined to be complete, raw water inlet valve 8 is closed and the layers A, B and C as indicated in Figure 4 will settle, in the water which automatically remains in the tank 1, in view of the fact that all valves in main link 6 are then closed except backwash valve 10.

In order to provide means for regenerating the above mentioned resins, an anion regenerant solution inlet means 19 is positioned in the upper portion of the tank just above the upper layer A as is clearly shown in Figures 1 and 2 of the drawings, and as also shown in Figure 2 a combined cation regeneration solution and raw water inlet means 20 is disposed in the medial portion of the tank which when stratification occurs after the hydraulic grading is completed as above described will be on or at a plane just below the medial line of the intermediate layer B, as is clearly shown in Figures 3 to 8 of the drawings.

An auxiliary waste outlet pipe 21 is also connected to the combined cation regenerant solution and raw water inlet means 20 to collect waste and regenerant solution depending on the desired manner of regeneration as is hereinafter described.

The anion regenerant solution inlet means 19 is provided with a central valve 22. The combined cation regenerant solution and raw water inlet means 20 is provided with a two way valve 23 to control the flow of raw water for rinse purposes or to admit cation regenerant solution as desired during regeneration. The auxiliary waste outlet 21 is also supplied with an auxiliary waste outlet control valve 24, all of which is clearly shown in Figures 1 and 2 of the drawings.

It is understood that all of the above mentioned valves are closed during normal operation and will be utilized only during the regeneration process.

*Anion regeneration*

When hydraulic grading is completed all valves are closed except the backwash valve 10. To regenerate the anion exchange resin layer A, anion regenerant solution inlet means 19 will receive anion regenerant solution through control valve 22 from any suitable source. At the same time auxiliary waste outlet pipe 21 is opened through its auxiliary control valve 24. Anion regenerant solution will then be able to flow out of the anion regenerant solution inlet means 19 by downward displacement of the water from the bed which passes through the cation regenerant solution and raw water inlet means in layer B of the bed to the waste outlet pipe 21 where it is passed to a reservoir or waste as desired.

The length of time required for anion exchange resin regeneration will also be empirical depending on size of bed, rate of flow etc. However, when it is determined that the anion exchange resin in layer A has been regenerated such as by some suitable chemical test, the control valve 22 and the auxiliary waste pipe valve 24 is closed.

*Rinsing and regeneration of cation exchange resin layer C*

Due to the fact that a portion of the anion regenerant solution will diffuse downwardly, it is believed that a portion of the cation exchange resin in layer C of the bed may be affected. This, however, may or may not be detrimental depending on the solutions being utilized for regeneration. For example: if a dilute sodium hydroxide solution is utilized as the anion regenerant solution and a dilute sulphuric acid solution as the cation regenerant solution, diffusion of the sodium hydroxide during anion regeneration will cause a portion of the cation regenerant to be changed into the "sodium" form. This is not detrimental to cation regeneration as it minimizes the precipitation which would be caused by calcium sulfate when the sulphuric acid regenerant solution is passed through the cation exchange resin during the regeneration thereof. Accordingly, under these conditions the rinsing step hereinafter described may be utilized or not as is desired.

Rinsing of the cation exchange resin layer C may be performed by several methods in the preferred form of the present invention. In the first and preferred method water is displaced downwardly by opening the waste valve 14 so that it will pass to the waste outlet 15. Auxiliary waste valve 24 is closed and two-way valve 23 is opened to raw water. Raw water will enter through the means 20 to pass downwardly through the cation exchange resin layer C to the waste outlet 15, through the waste valve 14.

This means of rinsing the cation layer C is preferred as cation regeneration may then be accomplished by merely turning two way valve 23 from the raw water position to the cation regenerant solution position and the cation regenerant solution from any suitable source of supply will then pass through means 20 downwardly to the outlet means 12 to waste outlet 15 through open waste valve 14 where it may be conducted to a reservoir to be recovered or to waste, as is clearly shown in Figures 5 and 6 of the drawings.

In another method of rinsing the cation exchange resin layer C, auxiliary waste valve 24 is opened and the raw water control valve 8 is opened. Water then passes from the raw water inlet pipe 5 down main conduit 6 entering tank 1 through outlet means 12 to displace the water upwardly in the tank 1 through the combined regenerant solution and raw water inlet means 20 to auxiliary waste outlet 21 through the open auxiliary waste valve 24.

Cation regeneration following this method would require that raw water inlet control valve 8 and auxiliary waste valve 24 be closed; waste valve 14 opened, and then two-way valve 23 turned to allow cation regenerant solution to pass through means 20 downwardly through the cation exchange resin layer C to waste outlet 15 as was above described.

Another method of rinsing would be to close all valves, open the waste valve 14 and the raw water control valve 7 whereby water could be passed downwardly through the entire tank.

Another method of rinsing would be to merely open raw water control valve 8 to pass water upwardly through the entire tank to the backwash line 11 through the open backwash valve control 10.

Rinsing, for example, of just the anion regeneration bed could also be performed by upward displacement of water by opening valve 23.

The cation exchange resin regeneration being the same following each of the above mentioned methods of rinsing.

The length of time required for cation exchange resin regeneration is as in the case of the anion exchange resin regeneration determined empirically and accordingly will be continued until the tests show that optimum regeneration has been reached, at which time two way valve 23 is closed.

Final rinsing

Regeneration of both the anion and cation exchange resins layers A and C having been completed, the next step is to rinse the entire bed to remove excess regenerant solutions of either type. This final rinsing may also be performed in any one of several methods depending on the conditions.

Figure 7 shows one method wherein all the valves are closed except the waste outlet valve 14, then raw water control valve 7 is opened and the water will then pass through raw water inlet pipe 5 to main conduit 6 and up through to outlet 9 into tank 1, whence it passes downwardly rinsing the entire bed, to pass through outlet means 12 to the waste outlet 15 through waste outlet valve 14 which is open.

Another method would be to pass the water upwardly through the bed. This is accomplished by closing all valves except the backwash control valve 10, then opening the raw water control valve 8, which allows raw water to pass from the raw water line 5 donwardly through the main conduit 6 to outlet means 12 thence upwardly through the tank 1 to outlet 9 whence it passes through main conduit 6 back to the backwash line 11 through backwash control valve 10 which is open.

A third method would be to wash each of the layers A and C separately. Thus, to wash the anion exchange resin layer A, all valves will be closed except the auxiliary waste valve 24. When raw water control valve 7 is now opened water passes from raw water line 5 upwardly through main conduit 6 to outlet 9, whence it passes downwardly into the tank 1 until the tank is filled to the level of the means 20. It will then pass through means 20 to the auxiliary waste outlet 21 through auxiliary waste valve 24.

To rinse the cation layer C, all valves are closed except the waste valve 14. When two-way valve 23 is opened to the raw water position as is shown in Figure 5, the raw water passes through means 20 displacing any water present in the tank downwardly through outlet means 12, to the waste outlet 15 on main conduit 6 through the waste valve 14 which is open.

In all instances, rinsing is continued until the pH of the water indicates it is neutral, which, once again can only be determined empirically for the specific apparatus in which the present invention is utilized.

Air bumping to remix

When the final rinsing is completed the bed which is now still in three layers A, B and C, as is shown in Figure 7, must be mixed so that it can be utilized for proper deionization of water passed therethrough. The usual method is by air bumping, which is accomplished by closing all valves, except air control valve 16 and air escape valve 25, for air outlet 26 clearly shown in Figures 1 and 2 of the drawings.

Air under pressure from some suitable source passes from the air line 13, to the main conduit 6 downwardly to the outlet means 12 whence it enters and passes upwardly through the bed 4, expanding, tumbling and agitating the three beds until they are thoroughly mixed as shown in Figure 2 of the drawings.

The equipment is then ready for manual operation once again and accordingly the air control valve 16 and air escape valve 25 are then closed and normal operation proceeds once again as described above.

Modified forms

It is obvious that the preferred form of mixed single bed deionization water treating equipment shown in Figures 1 to 8 may be easily modified to vary the operation or regeneration utilizing the present invention.

Figure 10:
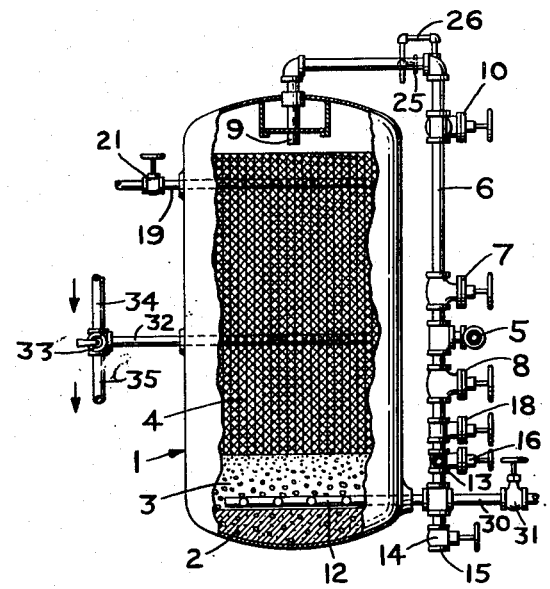
Figure 10 is a vertical section through the modified water softener showing the materials in mixed relationship to form the bed.

One such modified form is shown in Figures 9 and 10 in which identical parts bear the same character numerals. It is modified, however, in that the cation regenerant solution is brought in through a cation regenerant solution line 30 having a cation regenerant solution control valve 31 which is connected to the main conduit 6 opposite to the outlet means 12.

A combined raw water inlet and waste outlet means 32 is also provided with a two-way valve 33 to control the inlet of raw water from raw water line 34 or open the pipe to auxiliary waste outlet 35 as is desired.

In the modified form the step of cation regeneration may be varied so that instead of passing cation regenerant solution downwardly as is described in the preferred form, it is adapted to feed solution upwardly. This is accomplished by closing all valves except the cation regenerant solution control valves 31 and the two-way valve 33 which is opened to the waste outlet 35. Cation regenerant solution will pass from line 30 across the main conduit 6 to the outlet means 12, passing upwardly through the bed 4 which will be stratified through the cation layer C (not shown). The solution passes through the combined means 32 to the auxiliary waste outlet 35 through the two-way valve 33 which is open.

Another modified form can be further provided with the same construction as that shown in Figures 9 and 10 except that the centrally located pipe would be a combined raw water and anion regenerant solution inlet means and the upper pipe would be a waste outlet means or an upper waste outlet means could be provided on main conduit 6.

This latter mentioned modified form of construction allows for the upward displacement of anion regenerant solution by filling the tank with water opening the two-way valve to anion regenerant solution from some suitable source and opening the auxiliary waste outlet in the upper portion of the tank.

It is obvious that all of the said forms in combination with the stratification of the mixed bed by the use of a third material with intermediate density and backwash qualities has been shown and described to give the efficient regeneration desired. However, it is understood that the invention is not to be limited to the illustrated form of this combination but that the invention might be utilized in combination with other apparatus to produce similar efficient regeneration results and accordingly such combination may be widely modified and the processes of regeneration widely varied within the invention defined by the claims.

What is claimed is:

1. The method of regenerating the anion and cation exchange resins in mixed single bed deionization apparatus wherein said exchange resins undergo a saturation and regeneration cycle consisting in, forming said mixed bed for normal operation during the saturation cycle of anion exchange resins, cation exchange resins having a specific density greater than the anion exchange resins and a third substance having a specific density intermediate that of said anion and cation exchange resin, prior to regeneration backwashing and hydraulically grading said mixed bed to form a layer of anion exchange resins in the upper portion of said bed, a layer of cation exchange resins in the lower portion of said bed and a layer of the third substance intermediate these anion and cation layers, regenerating said anion layer by passing anion regenerant solution downwardly through said anion layer and drawing off said solution through the intermediate layer, regenerating said cation layer by passing cation regenerant solution into said intermediate layer to allow it to displace downwardly by gravity flow through said cation layer, rinsing said entire bed to remove excess regenerant solution remaining therein, and air bumping the bed to mix said layers to return the bed to condition for the normal operation of said deionization apparatus and the saturation portion of the exchange resin cycle.

2. The method of regenerating the anion and cation exchange resins in mixed single bed deionization apparatus wherein said exchange resins undergo a saturation and regeneration cycle consisting in, forming said mixed bed for normal operation during the saturation cycle of anion exchange resins, cation exchange resins having a specific density greater than the anion exchange resins and a third substance having a specific density intermediate that of said anion and cation exchange resins, prior to regeneration backwashing and hydraulically grading said mixed bed to form a layer of anion exchange resins in the upper portion of said bed, a layer of cation exchange resins in the lower portion of said bed and a layer of the third substance intermediate these anion and cation layers, regenerating said anion layer by passing anion regenerant solution downwardly through said anion layer and drawing off said solution through the intermediate layer, rinsing the entire bed and passing the rinsing solution to waste by downward displacement through said bed, regenerating said cation layer by passing cation regenerant solution into said intermediate layer to allow it to flow downwardly through said cation layer, rinsing said entire bed to remove excess regenerant solution remaining therein, and air bumping the bed to mix the layers to return the bed to condition for the normal operation of said deionization equipment and the saturation portion of the exchange resin cycle.

3. The method of regenerating the anion and cation exchange resins in mixed single bed deionization apparatus wherein said exchange resins undergo a saturation and regeneration cycle consisting in, forming said mixed bed for normal operation during the saturation cycle of anion exchange resins, cation exchange resins having a specific density greater than the anion exchange resins and a third substance having a specific density intermediate that of said anion and cation exchange resins, prior to regeneration backwashing and hydraulically grading said mixed bed to form a layer of anion exchange resins in the upper portion of said bed, a layer of cation exchange resins in the lower portion of said bed and a layer of the third substance intermediate these anion and cation layers, regenerating said anion layer by passing anion regenerant solution downwardly through said anion layer and drawing off said solution through the intermediate layer, rinsing said anion layer by passing rinsing solution downwardly through said anion layer and drawing it off through the intermediate layer, regenerating said cation layer by passing cation regenerant solution into said intermediate layer to allow it to displace downwardly by gravity flow through said cation layer, rinsing said entire bed to remove excess regenerant solution remaining therein, and air bumping the bed to mix said layers to return the bed to condition for the normal operation of said deionization apparatus and the saturation portion of the exchange resin cycle.

4. The method of regenerating the anion and cation exchange resins in mixed single bed deionization apparatus wherein said exchange resins undergo a saturation and regeneration cycle consisting in, forming said mixed bed for normal operation during the saturation cycle of anion exchange resins, cation exchange resins having a specific density greater than the anion exchange resins and a third substance having a specific density intermediate that of said anion and cation exchange resins, prior to regeneration backwashing and hydraulically grading said mixed bed to form a layer of anion exchange resins in the upper portion of said bed, a layer of cation exchange resins in the lower portion of said bed and a layer of the third substance intermediate these anion and cation layers, regenerating said anion layer by passing anion regenerant solution downwardly through said anion layer and drawing off said solution through the intermediate layer, rinsing said cation layer by passing rinsing solution into said intermediate layer and allowing it to displace downwardly through said cation layer then, regenerating said cation layer by passing cation regenerant solution into said intermediate layer to allow it to displace downwardly by gravity flow through said cation layer, rinsing said entire bed to remove excess regenerant solution remaining therein, and air bumping the bed to mix said layers to return the bed to condition for the normal operation of said deionization apparatus and the saturation portion of the exchange resin cycle.

5. The method of regenerating the anion and cation exchange resins in mixed single bed deionization apparatus wherein said exchange resins undergo a saturation and regeneration cycle consisting in, forming said mixed bed for normal operation during the saturation cycle of anion exchange resins, cation exchange resins having a specific density greater than the anion exchange resins and a third substance having a specific density intermediate that of said anion and cation exchange resins, prior to regeneration backwashing and hydraulically grading said mixed bed to form a layer of anion exchange resins in the upper portion of said bed, a layer of cation exchange resins in the lower portion of said bed and a layer of the third substance intermediate these anion and cation layers, regenerating said anion layer by passing anion regenerant solution downwardly through said anion layer and drawing off said solution through the intermediate layer, rinsing said anion layer by passing rinsing solution downwardly through said anion layer and drawing it off through said intermediate layer, rinsing said cation layer by passing rinsing solution into said intermediate layer and allowing it to displace downwardly through said cation layer then, regenerating said cation layer by passing cation regenerant solution into said intermediate layer to allow it to displace downwardly by gravity flow through said cation layer, rinsing said entire bed to remove excess regenerant solution remaining therein, and air bumping the bed to mix said layers to return the bed to condition for the normal operation of said deionization apparatus and the saturation portion of the exchange resin cycle.

6. The method of regenerating the anion and cation exchange resins in mixed single bed deionization apparatus wherein said exchange resins undergo a saturation and regeneration cycle consisting in, forming said mixed bed for normal operation during the saturation cycle of anion exchange resins, cation exchange resins having a specific density greater than the anion exchange resins and a third substance having a specific density intermediate that of said anion and cation exchange resins, prior to regeneration backwashing and hydraulically grading said mixed bed to form a layer of anion exchange resins in the upper portion of said bed, a layer of cation exchange resins in the lower portion of said bed and a layer of the third substance intermediate these anion and cation layers, regenerating said anion layer by passing anion regenerant solution downwardly through said anion layer and drawing off said solution through the intermediate layer, rinsing said anion layer by passing rinsing solution into said intermediate layer and allowing it to displace upwardly through said anion layer and to pass to waste, regenerating said cation layer by passing cation regenerant solution into said intermediate layer to allow it to displace downwardly by gravity flow through said cation layer, rinsing said entire bed to remove excess regenerant solution remaining therein, and air bumping the bed to mix said layers to return the bed to condition for the normal operation of said deionization apparatus and the saturation portion of the exchange resin cycle.

7. The method of regenerating the anion and cation exchange resins in mixed single bed deionization apparatus wherein said exchange resins undergo a saturation and regeneration cycle consisting in, forming said mixed bed for normal operation during the saturation cycle of anion exchange resins, cation exchange resins having a specific density greater than the anion exchange resins and a third substance having a specific density intermediate that of said anion and cation exchange resins, prior to regeneration backwashing and hydraulically grading said mixed bed to form a layer of anion exchange resins in the upper portion of said bed, a layer of cation exchange resins in the lower portion of said bed and a layer of the third substance intermediate these anion and cation layers, regenerating said anion layer by passing anion regenerant solution downwardly through said anion layer and drawing off said solution through the intermediate layer, rinsing said cation layer by passing rinsing solution upwardly through said cation layer and allowing said rinsing solution to pass to waste through said intermediate layer, regenerating said cation layer by passing cation regenerant solution into said intermediate layer to allow it to displace downwardly by gravity flow through said cation layer, rinsing said entire bed to remove excess regenerant solution remaining therein, and air bumping the bed to mix said layers to return the bed to condition for the normal operation of said deionization apparatus and the saturation portion of the exchange resin cycle.

8. The method of regenerating the anion and cation exchange resins in mixed single bed deionization apparatus wherein said exchange resins undergo a saturation and regeneration cycle consisting in, forming said mixed bed for normal operation during the saturation cycle of anion exchange resins, cation exchange resins having a specific density greater than the anion exchange resins and a third substance having a specific density intermediate that of said anion and cation exchange resins, prior to regeneration backwashing and hydraulically grading said mixed bed to form a layer of anion exchange resins in the upper portion of said bed, a layer of cation exchange resins in the lower portions of said bed and a layer of the third substance intermediate the anion and cation layers, regenerating said anion layer by passing anion regenerating solution into said intermediate layer and allowing it to displace upwardly through said anion layer, regenerating said cation layer by passing cation regenerant solution upwardly through said cation layer and then drawing the cation regenerant solution off through the intermediate layer, rinsing said entire bed to remove excess regenerant solution remaining therein, and air bumping the bed to mix the layers to return the bed to condition for the normal operation of said deionization equipment and the saturation portion of the exchange resin cycle.

9. The method of regenerating the anion and cation exchange resins in mixed single bed deionization apparatus wherein said exchange resins undergo a saturation and regeneration cycle consisting in, forming said mixed bed for normal operation during the saturation cycle of anion exchange resins, cation exchange resins having a specific density greater than the anion exchange resins and a third substance having a specific density intermediate that of said anion and cation exchange resins, prior to regeneration backwashing and hydraulically grading said mixed bed to form a layer of anion exchange resins in the upper portion of said bed, a layer of cation exchange resins in the lower portions of said bed and a layer of the third substance intermediate the anion and cation layers, regenerating said anion layer by passing anion regenerating solution into said intermediate layer and allowing it to displace upwardly through said anion layer, rinsing said anion layer by passing rinsing solution into said intermediate layer and allowing it to displace upwardly through the anion layer and to pass to waste, regenerating said cation layer by passing cation regenerant solution upwardly through said cation layer and then drawing the cation regenerant solution off through the intermediate layer, rinsing said entire bed to remove excess regenerant solution remaining therein, and air bumping the bed to mix the layers to return the bed to condition for the normal operation of said deionization equipment and the saturation portion of the exchange resin cycle.

10. The method of regenerating the anion and cation exchange resins in mixed single bed deionization apparatus wherein said exchange resins undergo a saturation and regeneration cycle consisting in, forming said mixed bed for normal operation during the saturation cycle of anion exchange resins, cation exchange resins having a specific density greater than the anion exchange resins and a third substance having a specific density intermediate that of said anion and cation exchange resins, prior to regeneration backwashing and hydraulically grading said mixed bed to form a layer of anion exchange resins in the upper portion of said bed, a layer of cation exchange resins in the lower portions of said bed and a layer of the third substance intermediate the anion and cation layers, regenerating said anion layer by passing anion regenerating solution into said intermediate layer and allowing it to displace upwardly through said anion layer, rinsing said cation layer by passing rinsing solution upwardly through said cation layer and allowing the rinsing solution to pass to waste through said intermediate layer, regenerating said cation layer by passing cation regenerant solution upwardly through said cation layer and then drawing the cation regenerant solution off through the intermediate layer, rinsing said entire bed to remove excess regenerant solution remaining therein, and air bumping the bed to mix the layers to return the bed to condition for the normal operation of said deionization equipment and the saturation portion of the exchange resin cycle.

JAMES F. McMULLEN.

References Cited in the file of this patent
UNITED STATES PATENTS

| Number | Name | Date |
| --- | --- | --- |
| 1,942,807 | Dotterweich | Jan. 9, 1934 |
| 1,942,808 | Dotterweich | Jan. 9, 1934 |
| 2,461,506 | Daniel | Feb. 15, 1949 |
| 2,466,662 | Mindler | Apr. 5, 1949 |
| 2,515,581 | Appelquest | July 18, 1950 |
| 2,578,937 | Kunin et al. | Dec. 18, 1951 |
| 2,578,938 | Kunin et al. | Dec. 18, 1951 |